(12) United States Patent
Endo et al.

(10) Patent No.: US 10,539,947 B2
(45) Date of Patent: Jan. 21, 2020

(54) INFORMATION PROCESSING DEVICE

(71) Applicant: FANUC CORPORATION, Minamitsuru-gun, Yamanashi (JP)

(72) Inventors: Satoru Endo, Yamanashi (JP); Shinya Nakamura, Yamanashi (JP); Hideaki Maeda, Yamanashi (JP)

(73) Assignee: Fanuc Corporation, Yamanashi (JP)

(*) Notice: Subject to any disclaimer, the term of this patent is extended or adjusted under 35 U.S.C. 154(b) by 0 days.

(21) Appl. No.: 15/729,823

(22) Filed: Oct. 11, 2017

(65) Prior Publication Data
US 2018/0107192 A1   Apr. 19, 2018

(30) Foreign Application Priority Data
Oct. 18, 2016  (JP) .................. 2016/204635

(51) Int. Cl.
*G06F 19/00* (2018.01)
*G05B 19/4068* (2006.01)
(Continued)

(52) U.S. Cl.
CPC ......... *G05B 19/4068* (2013.01); *G05B 19/19* (2013.01); *G05B 19/401* (2013.01);
(Continued)

(58) Field of Classification Search
CPC ................ G05B 19/4068; G05B 19/18; G05B 19/4093; G05B 19/4069;
(Continued)

(56) References Cited

U.S. PATENT DOCUMENTS 5,175,688 A * 12/1992 Sasaki ................ G05B 19/4069
700/180
5,274,574 A * 12/1993 Tsujido .............. G05B 19/4069
700/159
(Continued)

FOREIGN PATENT DOCUMENTS

JP   2003271215 A  *  9/2003
JP   2003271215 A     9/2003
(Continued)

OTHER PUBLICATIONS

Notification of Reasons for Refusal for Japanese Application No. 2016-204635, dated Mar. 20, 2018 with translation, 4 pages.
(Continued)

*Primary Examiner* — Zhipeng Wang
(74) *Attorney, Agent, or Firm* — RatnerPrestia

(57) ABSTRACT

An information processing device displays an NC machining program and a physical state of a machine tool that is operated based on the NC machining program. The information processing device acquires, during execution of a block in a machining block, data indicative of the physical state of the machine tool, associates the block that was being executed with the acquired data and stores the block and the data that have been associated. In addition, the information processing device refers to the database and draw the block using a color according to an intensity of the data, and displays the NC machining program.

7 Claims, 7 Drawing Sheets

(51) Int. Cl.
*G05B 19/19* (2006.01)
*G05B 19/401* (2006.01)
*G05B 19/4065* (2006.01)
*G06F 16/00* (2019.01)

(52) U.S. Cl.
CPC .............. *G05B 19/4065* (2013.01); *G05B 2219/35342* (2013.01); *G05B 2219/35497* (2013.01); *G06F 16/00* (2019.01)

(58) Field of Classification Search
CPC ........... G05B 2219/35312; G05B 2219/35489; G05B 2219/35497; G05B 19/19; G05B 19/401; G05B 19/4065; G05B 2219/35342; G06Q 10/10; G06Q 10/105; H04L 12/1813; G06F 17/30
See application file for complete search history.

(56) References Cited

U.S. PATENT DOCUMENTS

2013/0249919 A1* 9/2013 Osada .................... G06O 10/10
                                                         345/472

2016/0011583 A1   1/2016 Matsubara et al.

FOREIGN PATENT DOCUMENTS

| | | |
|---|---|---|
| JP | 2010-092405 A | 4/2010 |
| JP | 2013-37383 A | 2/2013 |
| WO | 2016027355 A1 | 2/2016 |
| WO | WO-2016027355 A1 * | 2/2016 ......... G05B 19/4068 |

OTHER PUBLICATIONS

Excel: Mark Fields automatically in color, CHIP, 2016 downloaded at https://praxistipps.chip.de/excel-felder-automatisch-farbig-markierengehtdas_31017, 4 pages.

Format the number in color, Computerwissen.de, 2013, downloaded at https://www.computerwissen.de/office/excel/artikel/zahlen-je-nach-groesse-farbigformatieren.html, 8 pages.

German Examination Report for German Application No. 10 2017 009 429.2, dated Nov. 14, 2019 with translation, 10 pages.

* cited by examiner

```
G1451H-25.V12.K5.C-25.L0.M0.T1.
G1451H-25.V15.K3.D15.L0.M0.T1.
G1451H-55.V20.K4.C-55.D20.L0.M0.T1.
↓
[
  ["G1451H-25.V12.K5.C-25.L0.M0.T1.",
    [
      [2016/7/14 9:45:37.32, 10.1],
      [2016/7/14 9:45:37.64, 12.2],
      [2016/7/14 9:45:37.96, 9.3],
      [2016/7/14 9:45:38.28, 8.0],
      [2016/7/14 9:45:38.60, 9.4],
      [2016/7/14 9:45:38.92, 9.5]
    ]
        TIME            DATA
  ],
  ["G1451H-25.V15.K3.D15.L0.M0.T1.",
    [
      [2016/7/14 9:45:39.24, 9.0],
      [2016/7/14 9:45:39.56, 9.2],
      [2016/7/14 9:45:39.88, 9.9],
      [2016/7/14 9:45:40.20, 10.0]
    ]
  ],
  :
```

ENTRIES FOR ONE BLOCK

```
[
    [10.333, 4.551, -119.980 , 10.1],
    [10.334, 4.551, -119.980 , 12.2],
    [10.335, 4.551, -119.980 , 9.3],
    [10.337, 4.551, -119.980 , 8.0],
    [10.338, 4.551, -119.980 , 9.4],
    [10.343, 4.552, -119.980 , 9.5]
    [10.343, 4.553, -119.980 , 9.0],
],
       X       Y        Z      DATA
       _____/  
           COORDINATE
             VALUES
```

INFORMATION PROCESSING DEVICE

BACKGROUND OF THE INVENTION

1. Field of the Invention

The present invention relates to an Information processing device, and particularly to a technique for overlay-displaying, on a machining program, various pieces of data at the time of execution of the machining program.

2. Description of the Related Art

FIG. 1 is an example of a control screen in a conventional numerical controller.

Referring to FIG. 1, a load meter for displaying an instantaneous value of a load on a servo is arranged on this screen along with a numerical control (NC) machining program being executed. The instantaneous value of the load is very useful, for example, in determining whether or not a cutting depth is appropriate. Meanwhile, it is necessary to observe time-series variations in the load in order to review the load level on the tool (servo) as a whole or the like. In order to obtain the time-series variations in a load using the conventional load meter, an operator needs to keep viewing the load meter.

In addition, even if the time-series variations in the load are simply displayed in the form of a graph as illustrated in FIG. 2, it is difficult to understand to which part of the NC machining program the load at a certain point corresponds. Accordingly, it is difficult to make a review as to at which part of the NC machining program the load is intensified and at which part the load is weakened.

In this regard, Japanese Patent Application Laid-Open No. 2013-037383 discloses a technique that makes it easier to recognize the correspondence between a user program and a graph representing a load torque by displaying the user program and the graph of the load torque side by side with their time axes aligned.

Meanwhile, Japanese Patent Application Laid-Open No. 2010-092405 displays a technique that makes it easier to recognize the correspondence between a machining program and a time chart of a machining load by displaying their corresponding parts in the same color.

However, according to the techniques disclosed in the above-mentioned Japanese Patent Application Laid-Open Nos. 2013-037383 and 2010-092405, the user program and the graph representing the load torque are displayed in separate areas, and the drawback of these techniques is that it is difficult to intuitively recognize the correspondence therebetween, for a careful comparison therebetween is necessary.

SUMMARY OF THE INVENTION

An object of the present invention, which has been made to overcome such a drawback, is to provide an information processing device that enables intuitive recognition of the correspondence between a machining program and various pieces of data at the execution time thereof by overlay-displaying the various pieces of data at the execution time upon the machining program.

The information processing device according to the present invention displays numerical control (NC) machining program including one or more blocks and a physical state of a machine tool operated on the basis of the NC machining program. The information processing device includes: a machining operation unit configured to acquire, during execution of the block, data indicative of the physical state of the machine tool; a database in which the block being executed and the acquired data with the block and the data associated with each other; and a display unit configured to refer to the database, draw the block using a color according to an intensity of the data, and display the NC machining program.

The display unit may be configured to cause a size of a display area of the block to vary depending on an execution time of the block.

The display unit may be configured to determine a size of a display area of the block independently of an execution time of the block.

The display unit may be configured to divide the display area of the block into regions by a number of pieces of the data associated with the block, and draw each of the divided regions using the colors according to the intensities of the pieces of data.

The machining operation unit may be further configured to acquire coordinate values of a tool of the machine tool when acquiring the data, the database may be further configured to store the data and the coordinate values of the tool with these data and coordinate values associated with each other, and the display unit may be further configured to refer to the database and draw a tool path of the machine tool using the color according to the intensity of the data.

The display unit may be configured to provide a background color of the block using the color according to the intensity of the data.

The display unit may be configured to draw, in place of the block, an indicator provided near the block using the color according to the intensity of the data.

According to the present invention, it is made possible to provide an information processing device that enables intuitive recognition of the correspondence between a machining program and various pieces of data at the time of execution of the machining program by overlay-displaying on the machining program the various pieces of data at the time of execution of the machining program.

BRIEF DESCRIPTION OF THE DRAWINGS

FIG. 5 is a diagram illustrating a display mode of a display unit in a first embodiment;

FIG. 6 is a diagram illustrating a display mode of a display unit in a second embodiment;

FIG. 11 is a diagram illustrating an example of a storing data of data in a database.

DETAILED DESCRIPTION OF THE PREFERRED EMBODIMENTS

Figure 1:
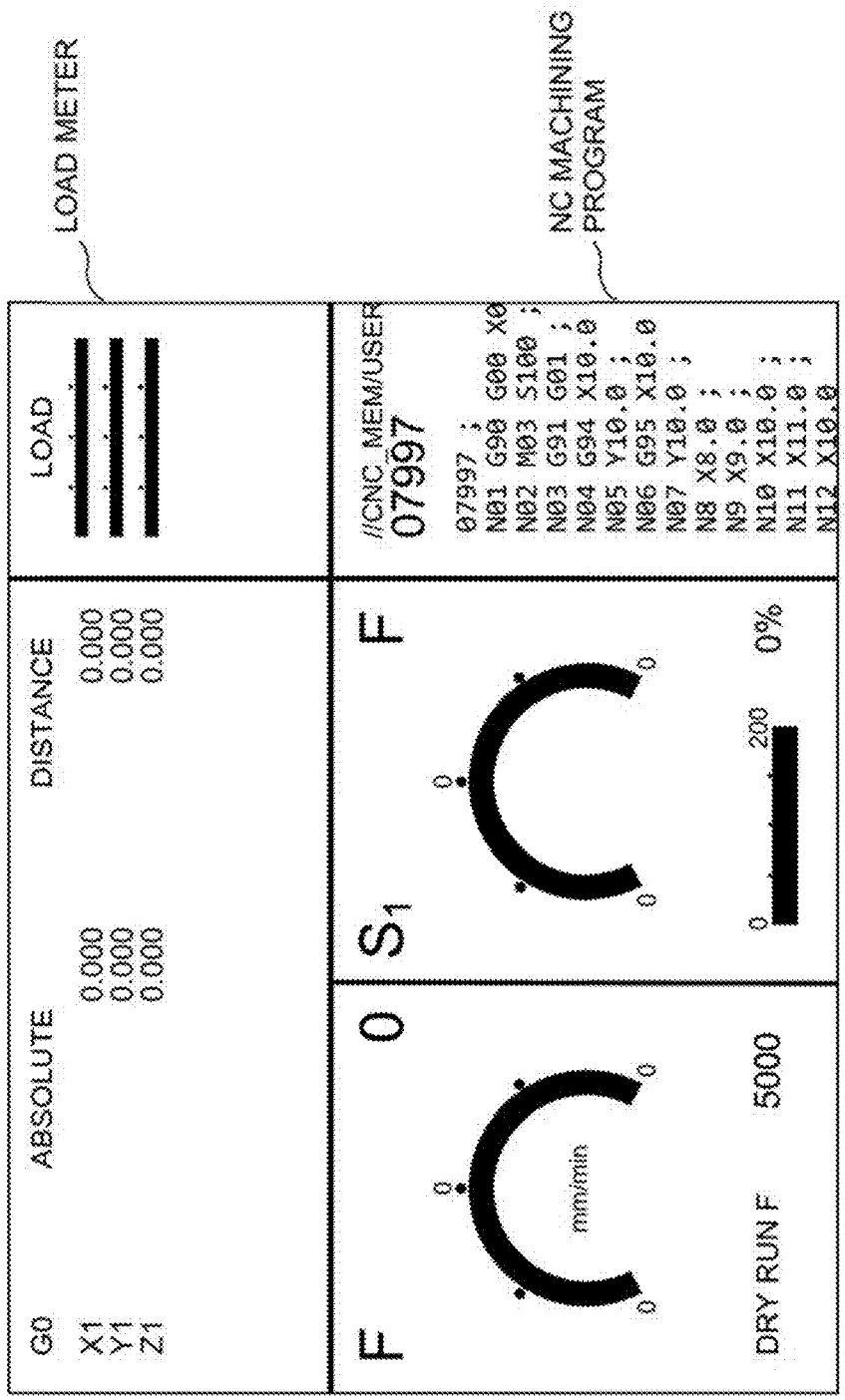
FIG. 1 is a diagram illustrating an example of a conventional NC machining program and a conventional data display method.
Figure 2:
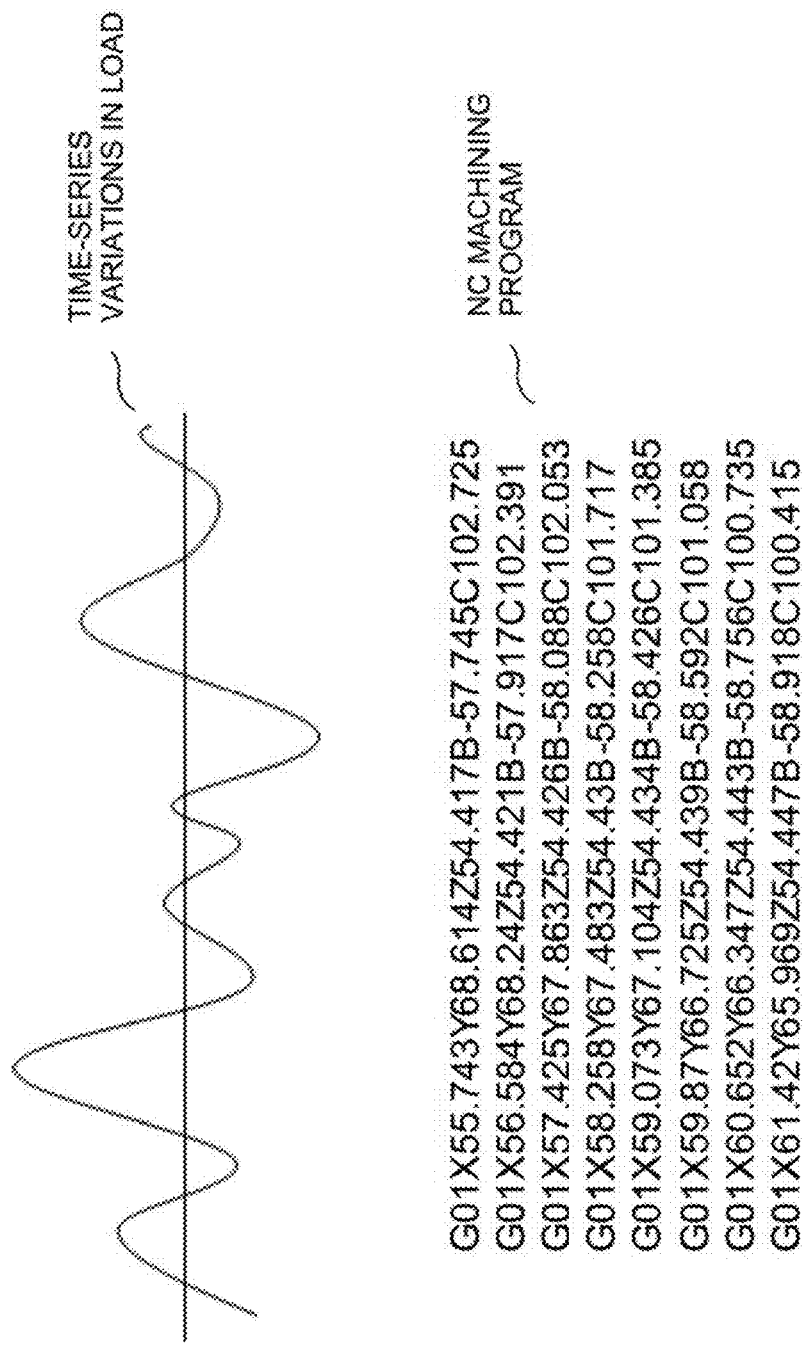
FIG. 2 is a diagram illustrating an example of a conventional NC machining program and a conventional data display method.
Figures 3, 4:
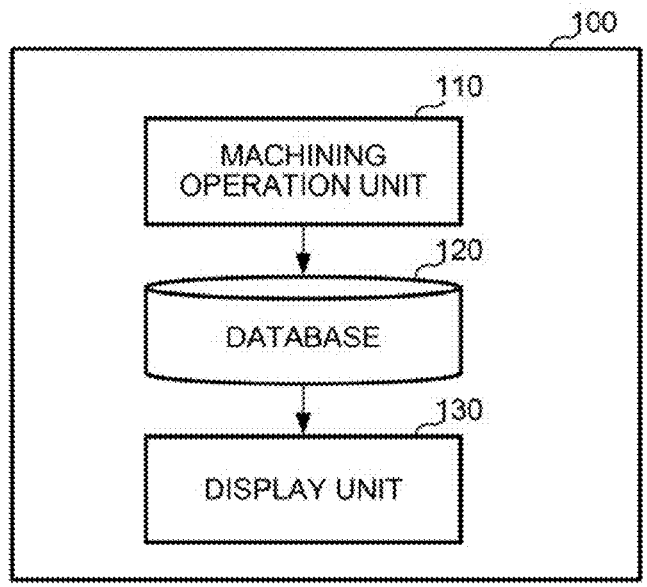
FIG. 3 is a diagram illustrating a configuration of an information processing device according to an embodiment of the present invention.
FIG. 4 is a diagram illustrating an example of a data storage form in a database.

FIG. 3 is a block diagram that illustrates a configuration of an information processing device 100 in accordance with an embodiment of the present invention.

The information processing device 100 includes a machining operation unit 110, a database 120, and a display unit 130. The information processing device 100 is typically a computer that logically realizes the above-described respective components by executing predetermined processing in accordance with programs stored in a storage device by a central information processing unit (CPU). The information processing device 100 is typically a personal computer, a server computer, or a numerical controller. The information processing device 100 may be realized by one single computer or by distributed processing on a plurality of computers.

The machining operation unit 110 is configured to execute an NC machining program to operate a machine tool, acquire various pieces of data, for example, for each block included in the NC machining program during execution of the machining program, associate the various pieces of data that have been acquired with an acquisition time thereof, and store the pairs of the piece of data and its acquisition time that have been associated with each other in the database 120. Here, the various pieces of data are pieces of information each including an index that allows observation of various physical phenomena caused by execution of the NC machining program such as a load on a servo, a cutting speed, a noise level, and the like.

FIG. 4 illustrates an example of the format of the data stored in the database 120 by the machining operation unit 110.

In this example, the information in the database 120 is composed of one or more entries respectively corresponding to one or more blocks included in the NC machining program. In each entry, the values of various pieces of data acquired during execution of the block are stored in association with the acquisition time.

The display unit 130 is configured to refer to the database 120 in which various pieces of data are stored and display the various pieces of data acquired during execution of each block with each block of the NC machining program overlaid (superimposed). Specifically, for example, the display unit 130 converts various pieces of data into colors, and carries out the overlay display by coloring characters, background, etc. of the NC machining program with the colors obtained by the above conversion. Methods of implementation of the display unit 130 will be described below by way of several exemplary embodiments.

First Embodiment

Figures 5, 6:
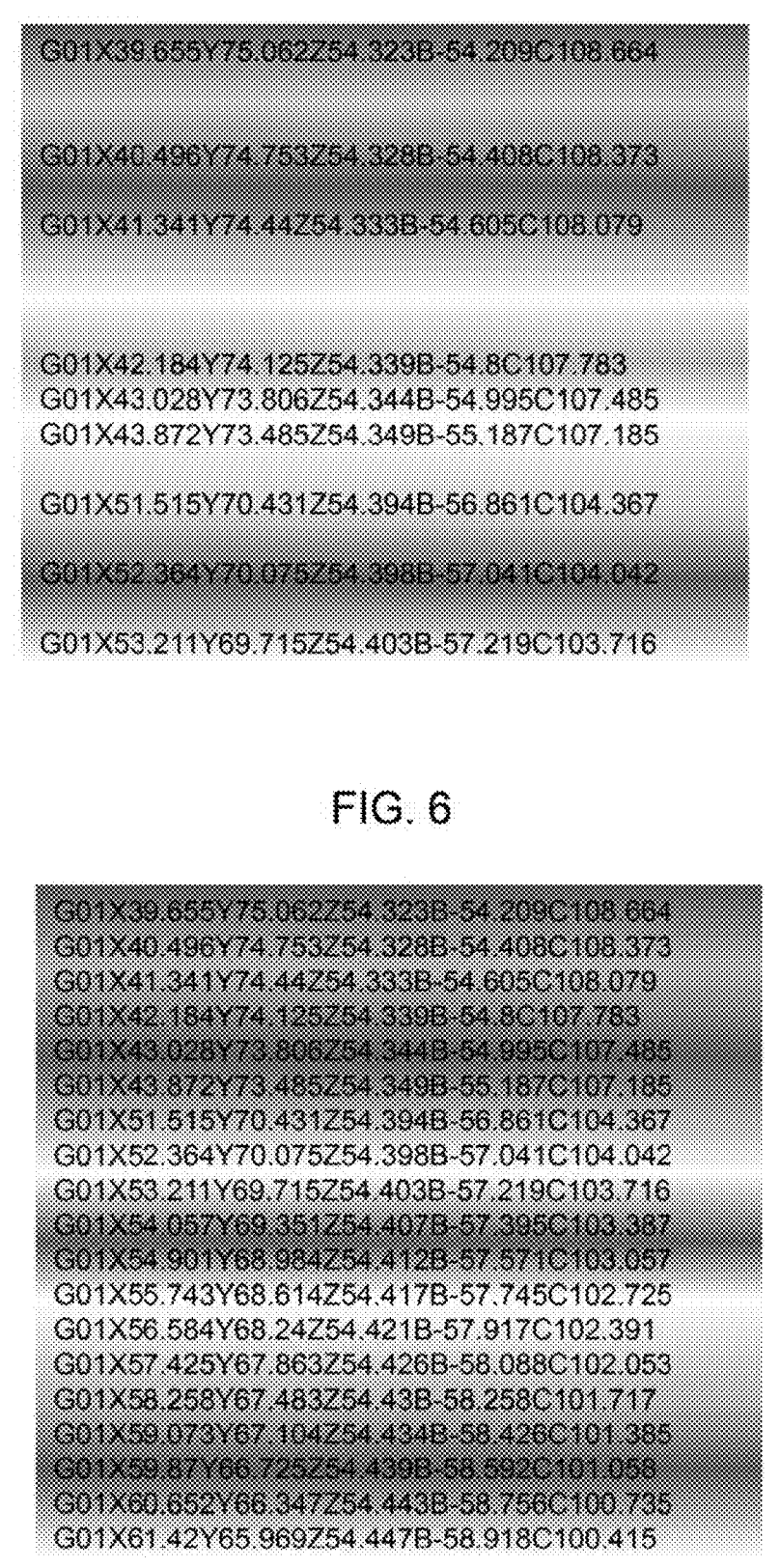

FIG. 5 illustrates a rendering example according to a first embodiment. According to a feature of the first embodiment, an intensity of data of each of machining blocks is represented by a color arrangement of a background color, and a size of a background coloration area varies in response to an observation time of the data.

Step 11: Calculating rendering information for each block

The display unit 130 performs, for each block included in the NC machining program, calculation related to the step 11 for all pieces of data associated with the block.

The display unit 130 defines a width of the background coloration area in the unit observation time. For example, the display unit 130 holds in advance the definition that specifies use of a background coloration area having a width of 3 centimeters per second in a storage area (not shown).

The display unit 130 calculates the width of the background coloration area according to the observation time of the data. For example, if the acquisition time of a certain piece of data (more specifically, for example, the period of time from an acquisition time of a certain piece of data to another acquisition time of another piece of data) is 32 milliseconds (msec), then the display unit 130 calculates the width of the background coloration area to be 9.6 mm on the basis of the above definition (3-cm width per second).

The display unit 130 calculates the background color according to the data. First, the display unit 130 defines a minimum value and a maximum value of the data. For example, the minimum value=0 and the maximum value=15 are defined. Next, the display unit 130 defines a background color corresponding to the minimum value and another background color corresponding to the maximum value of the data. For example, the minimum value is defined as RGB (0, 255, 255) and the maximum value is defined as RGB (0, 0, 0). The display unit 130 holds these definitions in advance in the storage area. When the data is equal to or less than the minimum value, the display unit 130 adopts the background color corresponding to the minimum value. When the data is equal to or larger than the maximum value, the background color corresponding to the maximum value is adopted. When the data is between the minimum and maximum values, the display unit 130 calculates the background color linearly. For example, if the data is 5 (33% of the maximum value), the background color can be calculated as RGB (0, 170, 170).

Step 12: Providing background colors on the NC machining program display screen

The display unit 130 performs a background coloration process for each block included in the NC machining program. First, the display unit 130 draws a background coloration area using the width and the color calculated in the step 11 for each data corresponding to the block. Then, a background coloration area corresponding to one block is formed by time-serially linking these background coloration areas.

Figure 9:
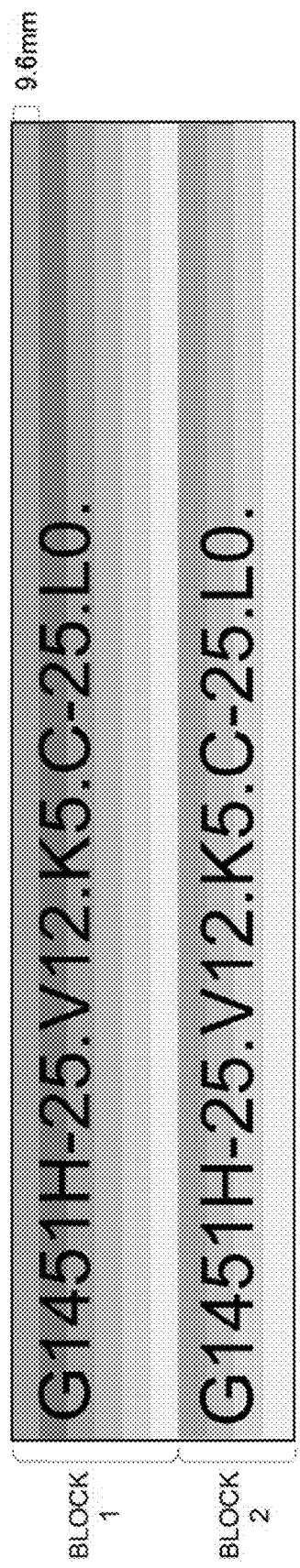
FIG. 9 is a diagram illustrating a display mode of the display unit in the first embodiment.

The formation of this background coloration area will be specifically described with reference to FIG. 9.

Let us assume here that six data items are acquired during execution of Block 1 and the observation time of each piece of data was 32 msec. At this point, the background of the Block 1 is formed by interconnecting six background coloration areas each having a width of 9.6 mm. Then, each background coloration area is colored with a color corresponding to the value of the data. Four pieces of data were acquired during execution of Block 2, and the observation time of each piece of data was 32 msec, so that the background of Block 2 is composed of four background coloration areas each having a width of 9.6 mm, and each background coloration area is colored with a color corresponding to the value of the data.

According to the first embodiment, since the length of the execution time is taken into account and represented by the size of the background coloration area, it is made possible to recognize variations in various pieces of data during the machining with an accurate time.

Second Embodiment

FIG. 6 illustrates a rendering example according to a second embodiment. According to the features of the second embodiment, the intensity of the data for each machining block is represented by color arrangement of the background color and the size of the background coloration area for each block is unchanged and independent of the observation time of the data. In other words, the background coloration area as illustrated in the first embodiment is compressed and displayed with a fixed size for each machining block.

Step 21: Rendering information is calculated for each block.

For each block included in the NC machining program, the display unit 130 executes the calculation according to the step 21 for all pieces of data associated with the block.

The display unit 130 defines the width of the background coloration area per block. For example, the display unit 130 holds in advance the definition that specifies use of a background coloration area having a width of 3 cm per machining block in a storage area (not shown).

The display unit 130 calculates the width of the background coloration area corresponding to one piece of data based on the number of pieces of data corresponding to the block and the width of the background coloration area predefined for the block. For example, when six pieces of data corresponding to a certain block are stored, the display unit 130 calculates the width of the background coloration area corresponding to one piece of data as 0.5 cm which is equivalent to 16.6% of the above definition (3 cm width per block).

The display unit 130 calculates the background color according to the data in the same manner as in the first embodiment.

Step 22: Background colors are provided on the NC machining program display screen.

The display unit 130 forms the background coloration area corresponding to one block in the same manner as in the first embodiment.

Figure 10:
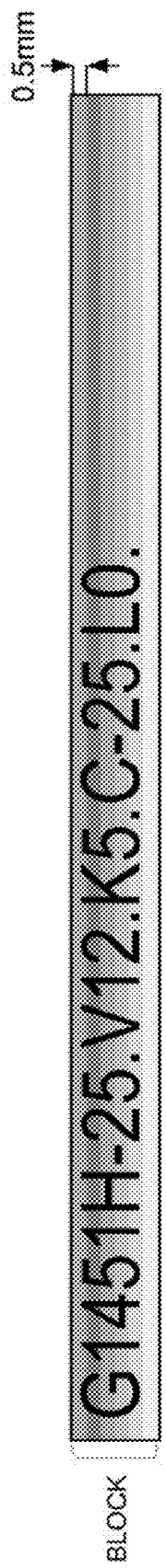
FIG. 10 is a diagram illustrating a display mode of the display unit in the second embodiment.

The formation of the background coloration area will be specifically described below with reference to FIG. 10

It is assumed here that the background coloration area of the Block 1 is fixed to 3 centimeters. It is also assumed that six data items are acquired during execution of the Block 1. At this point, the background of the Block 1 is composed of a series of six background coloration areas each having a width of 0.5 millimeters. Each background coloration area is colored with the color corresponding to the value of the data.

According to the second embodiment, since the background coloration area can be compressed and displayed on a per-block basis, it is made possible to view the entire variation trend of various pieces of data.

Third Embodiment

Figure 7:
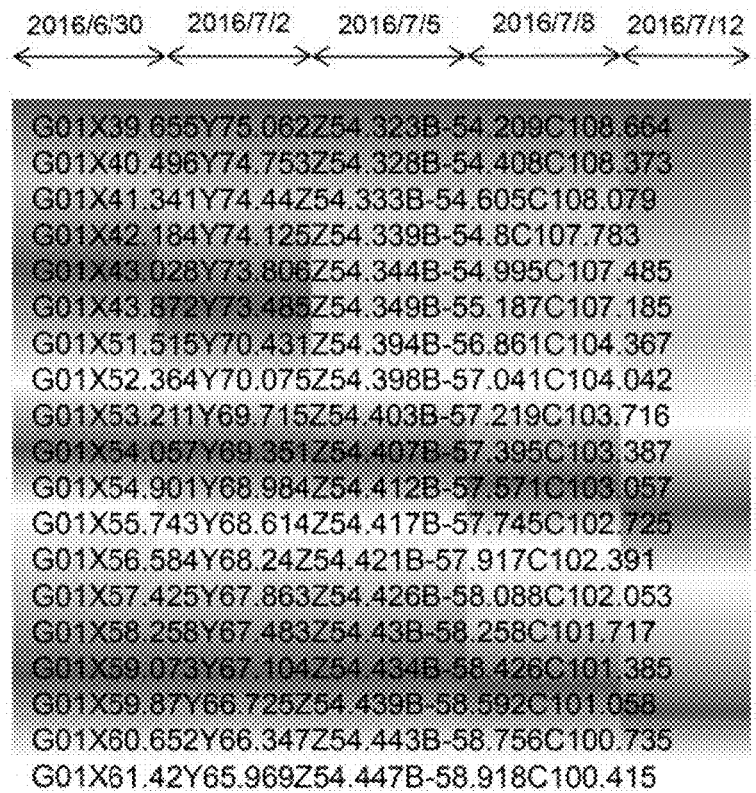
FIG. 7 is a diagram illustrating a display mode of the display unit in a third embodiment.

FIG. 7 illustrates a rendering example according to a third embodiment. According to the features of the third embodiment, the background coloration area of the NC machining program is divided into a plurality of columns. The background color of each column is the one obtained by rendering the data acquired at a certain round of measurement in the manner of the second embodiment. Specifically, the display mode according to the third embodiment is configured by arranging background coloration areas each representing one of the pieces of data acquired at different measurement rounds, for example, at different dates and times, such that they are arranged in the column direction. In the example of FIG. 7, the pieces of data acquired on five different days are displayed side by side.

According to the third embodiment, it is made possible to observe variations in the operation of the machine tool, for example, due to seasonal fluctuation or aging degradation. It is also useful to display pieces of data acquired from a plurality of machine tools at the same time or different appropriate timings with one piece of data arranged next to another rather than displaying pieces of data acquired from the same machine tool at different measurement rounds. This makes it possible to observe the variations in the operation of the machine tool due to its installation environment or the like.

Fourth Embodiment

Figure 8:
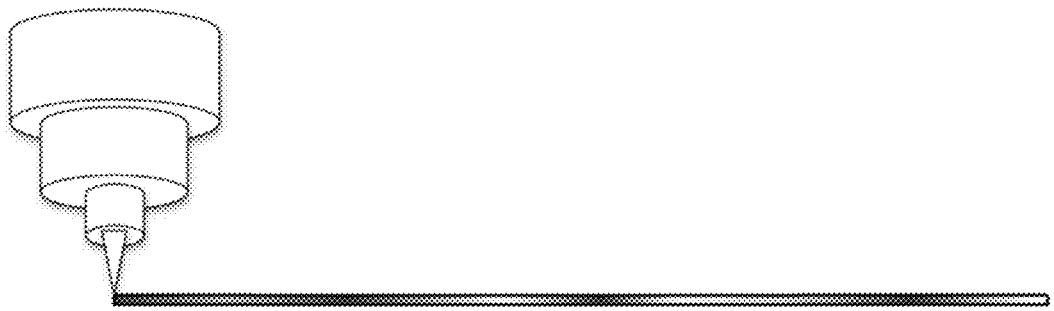
FIG. 8 is a diagram illustrating a display mode of the display unit in a fourth embodiment.

According to the features of a fourth embodiment, in addition to providing the background colors by any one of the first to third embodiments, the intensity of the data is represented by the color arrangement at the time of rendering a tool path. FIG. 8 illustrates a rendering example of the tool path in the fourth embodiment.

Step 41: Coordinate values of the tool at the time of operation and the data in the coordinate values are recorded.

The machining operation unit 110 executes the NC machining program to operate the machine tool, acquires various pieces of data at any appropriate time, and stores the acquired pieces of data in the database 120 in a manner such that they are associated with the coordinate values of the tool at the time of data acquisition.

FIG. 11 illustrates an example of a format of the data stored in the database 120 by the machining operation unit 110. In this example, the value of the data acquired during operation is stored in pair with the corresponding coordinate values of the tool at the time of acquisition of each piece of data.

Step 42: The rendering information is drawn.

The display unit 130 calculates the background color for all the pieces of data in the same manner as in the first embodiment.

Step 43: The tool path is drawn

The display unit 130 draws the tool path using the background color calculated in the step 42. More specifically, the display unit 130 draws a tool path from the coordinate values of the tool at that time point to the coordinate values of the tool at the next time point, for example, using a color calculated based on data acquired at a certain point in time.

According to the fourth embodiment, since the intensity of the data is taken into account and represented not only in the NC machining program but also in the tool path, it is made possible to more intuitively recognize the variations in various pieces of data.

It should be noted that the present invention is not limited to the above-described embodiment, and can be appropriately modified without departing from the spirit of the invention. The present invention can modify any constituent elements of the embodiment or omit any constituent elements of the embodiment within the scope of the invention.

For example, although it is assumed in the above-described embodiments that there is only one machine tool from which various pieces of data are collected, the present invention is not necessarily limited thereto. The information processing device 100 is also capable of collecting various pieces of data from a plurality of machine tools. In this case, it is preferable that the machining operation unit 110 sorts the various pieces of data on a per-machine-tool basis and stores the sorted pieces of data in the database 120. It is also preferable that the display unit 130 executes the series of rendering processes for each machine tool.

In addition, although the display unit 130 in the above embodiments causes the background color of the NC machining program to vary in accordance with the intensity of data, the present invention is not necessarily limited thereto. For example, the display unit 130 may change the color, size, thickness, or type of a font instead of the background color. Alternatively, an indicator (typically a color bar or the like) capable of being color-displayed may be provided in the vicinity of the display area of the NC machining program such that the color of the indicator is change instead of the background color of the NC machining program.

The invention claimed is:

1. An information processing device which displays numerical control (NC) machining program including one or more blocks and a physical state of a machine tool operated on the basis of the NC machining program, the information processing device comprising:
   a processor configured to control the machine tool by executing a block of code in the NC machining program, and acquire, during the execution of the block, a plurality of data indicative of the physical state of the controlled machine tool during a plurality of time points during the execution of the block;
   a memory device configured to store a database in which the block being executed and the acquired plurality of data are associated with each other; and
   a display screen configured to refer to the database, draw the block using a plurality of colors or color shades according to an intensity of the plurality of data, and display the NC machining program.

2. The information processing device according to claim 1, wherein the display screen is configured to cause a size of a display area of the block to vary depending on an execution time of the block.

3. The information processing device according to claim 1, wherein the display screen is configured to determine a size of a display area of the block independently of an execution time of the block.

4. The information processing device according to claim 3, wherein the display screen is configured to divide the display area of the block into regions by a number of pieces of the data associated with the block, and draw each of the divided regions using the colors according to the intensities of the pieces of data.

5. The information processing device according to claim 1, wherein the processor is further configured to acquire coordinate values of a tool of the machine tool when acquiring the data,
   the database is further configured to store the data and the coordinate values of the tool with these data and coordinate values associated with each other, and
   the display screen is further configured to refer to the database and draw a tool path of the machine tool using the color according to the intensity of the data.

6. The information processing device according to claim 1, wherein the display screen is configured to provide a background color of the block using the color according to the intensity of the data.

7. The information processing device according to claim 1, wherein the display screen is configured to draw, in place of the block, an indicator provided near the block using the color according to the intensity of the data.

* * * * *